United States Patent [19]

Oda et al.

[11] Patent Number: 5,788,926
[45] Date of Patent: Aug. 4, 1998

[54] PLASTIC BOTTLE AND PROCESS FOR MAKING THE SAME

[75] Inventors: Yasuhiro Oda; Yoshitsugu Maruhashi, both of Kanagawa, Japan

[73] Assignee: Toyo Seikan Kaisha, Ltd., Tokyo, Japan

[21] Appl. No.: 692,719

[22] Filed: Aug. 6, 1996

[30] Foreign Application Priority Data

Aug. 16, 1995 [JP] Japan ..................... 7-208940

[51] Int. Cl.$^6$ ..................... B29C 49/06
[52] U.S. Cl. ............ 264/512; 264/515; 264/523; 264/540
[58] Field of Search ............ 428/35.7; 526/352; 264/512, 513, 515, 521, 523, 537, 540

[56] References Cited

U.S. PATENT DOCUMENTS

| | | | |
|---|---|---|---|
| 4,397,916 | 8/1983 | Nagano | 428/35.7 |
| 4,921,733 | 5/1990 | Gibbons | 428/35.9 |
| 5,041,247 | 8/1991 | Kim | 264/540 |
| 5,153,039 | 10/1992 | Porter | 428/35.7 |
| 5,180,190 | 1/1993 | Kersey | 428/36.1 |
| 5,405,880 | 4/1995 | Kimura | 428/35.7 |
| 5,443,868 | 8/1995 | Oda | 428/35.7 |
| 5,500,261 | 3/1996 | Takei | 428/35.7 |
| 5,601,891 | 2/1997 | Herman | 428/35.7 |

*Primary Examiner*—Paul R. Michl
*Attorney, Agent, or Firm*—Sughrue, Mion, Zinn, Macpeak & Seas, PLLC

[57] ABSTRACT

A plastic bottle having at least an outer face formed of an olefin-base resin, wherein the olefin-base resin has a density and a melt tension satisfying the following formula (1):

$$Y \leq -AX + B \qquad (1)$$

wherein Y is the density (g/cm$^3$) of the olefin-base resin, X is the melt tension (g) of the olefin-base resin, A is a constant having a value of 0.0116 and B is a constant having a value of 0.962, and the bottle outer face has a glossiness of 60% (60° gloss) or more. Also disclosed is a process for making the above-described plastic bottle.

15 Claims, 4 Drawing Sheets

PLASTIC BOTTLE AND PROCESS FOR MAKING THE SAME

FIELD OF THE INVENTION

The present invention relates to a plastic bottle having excellent surface gloss and a process for making the plastic bottle. More specifically, the present invention relates to a plastic bottle having excellent surface gloss and to a process for making the same, comprising at least an outer surface formed of an olefin resin.

BACKGROUND OF THE INVENTION

Plastic hollow vessels formed by blow-molding are lightweight, have excellent shock resistance and accordingly, are widely used as packaging containers for various foods, seasonings and toiletries. Vessels now in use include single-layer vessels and multi-layer vessels (bottles). The inner and outer surfaces of the vessel are mostly formed of a polyolefin resin such as polyethylene and polypropylene from the standpoint of sanitary properties and moisture resistance.

The polyolefin resins for use in hollow molding are generally of a different grade than those typically used for molding. More specifically, in hollow molding, the molten parison is readily drawn down due to its own weight (called "draw down") or the molten parison itself corrugates or develops a sharkskin (called "melt fracture"). In order to prevent these phenomena, resins having a melt flow rate (MFR) of 2.0 g/10 min or less, a relatively high molecular weight and a wide molecular weight distribution Mw/Mn of from 3.5 to 7 are used. These resins effectively prevent the above-described draw down but do not effectively prevent melt fracture. Furthermore, the vessel walls formed therefrom have poor surface gloss and inadequate transparency. When used as a bottling product, the appearance of the bottle contents is considerably inferior to that of a glass bottling product, and the commercial value thereof is disadvantageously lowered.

Japanese Unexamined Patent Publication (kokai) No. 2-215529 describes a multi-layer plastic vessel having excellent surface gloss. This is a multi-layer plastic vessel comprising a laminate of two or more kinds of resin layers, wherein the outermost surface layer comprises an ethylene-propylene random copolymer having an ethylene content of from 2 to 8 wt%, a melt flow rate of 2.5 g/10 min and an Mw/Mn ratio of from 3 to 5.

In a conventional process for producing an olefin resin-made bottle, a sandblast mold cavity must be used to achieve good air bleeding during molding. However, the sandblast face is transferred to the outer face of the olefin resin bottle that is being formed. Due to the transferred pattern, the bottle outer surface necessarily has low gloss.

The above-described multi-layer vessel produced by blow molding has improved surface gloss as compared with a general olefin resin-made bottle. However, it still has inadequate surface gloss when compared with other molded articles such as a film.

SUMMARY OF THE INVENTION

Accordingly, an object of the present invention is to provide a plastic bottle made of an olefin resin having excellent surface gloss and which is free from the above-described problems encountered in a blow-molded olefin resin bottle.

The present invention provides a plastic bottle comprising at least an outer face formed of an olefin-base resin, wherein said olefin-base resin has a density and a melt tension satisfying the following formula (1):

$$Y \leq -AX + B \tag{1}$$

wherein Y is the density (g/cm$^3$) of the olefin-base resin, X is the melt tension (g) of the olefin-base resin, A is a constant having a value of 0.0116 and B is a constant having a value of 0.962, and the bottle outer face has a glossiness of 60% (60° gloss) or more.

The present invention also provides a process for making a glossy plastic bottle comprising blow-molding a parison comprising at least an outer face formed of an olefin-base resin in a porous mold having a mirror inner face, wherein the olefin-base resin has a density and a melt tension satisfying formula (1) above.

DETAILED DESCRIPTION OF THE INVENTION

The plastic bottle of the present invention is characterized in that at least an outer surface layer of the vessel comprises an olefin-base resin layer satisfying formula (1) above, and the bottle outer face has a glossiness of 60% (60° gloss) or more.

As described above, the poor surface gloss of a blow-molded vessel having an olefin resin surface as compared with other molded articles such as a film is due to transfer of the sandblast face of the mold cavity to the surface of the blow-molded article, or to the formation of peculiar patterns such as a sharkskin on the surface of the molded article due to the melt characteristics of the resin.

The present inventors have found that among those factors which reduce the surface gloss of blow-molded articles, the surface unevenness due to transfer of the sandblast face of the mold can be overcome when a porous mold having a mirror inner face is used. Furthermore, when the density and melt tension of the olefin resin is selected within a certain range, the olefin-base resin tightly adheres to the mirror face of the mold cavity upon blow molding. As a result, the surface gloss of the blow-molded article is enhanced.

Thus, the present inventors surprisingly discovered that by selecting an olefin-base resin having a density and melt tension satisfying formula (1) above as an outer surface layer of the blow-molded vessel, the resin adheres to the mirror inner face of the mold cavity to thereby markedly improve surface gloss.

Figure 1:
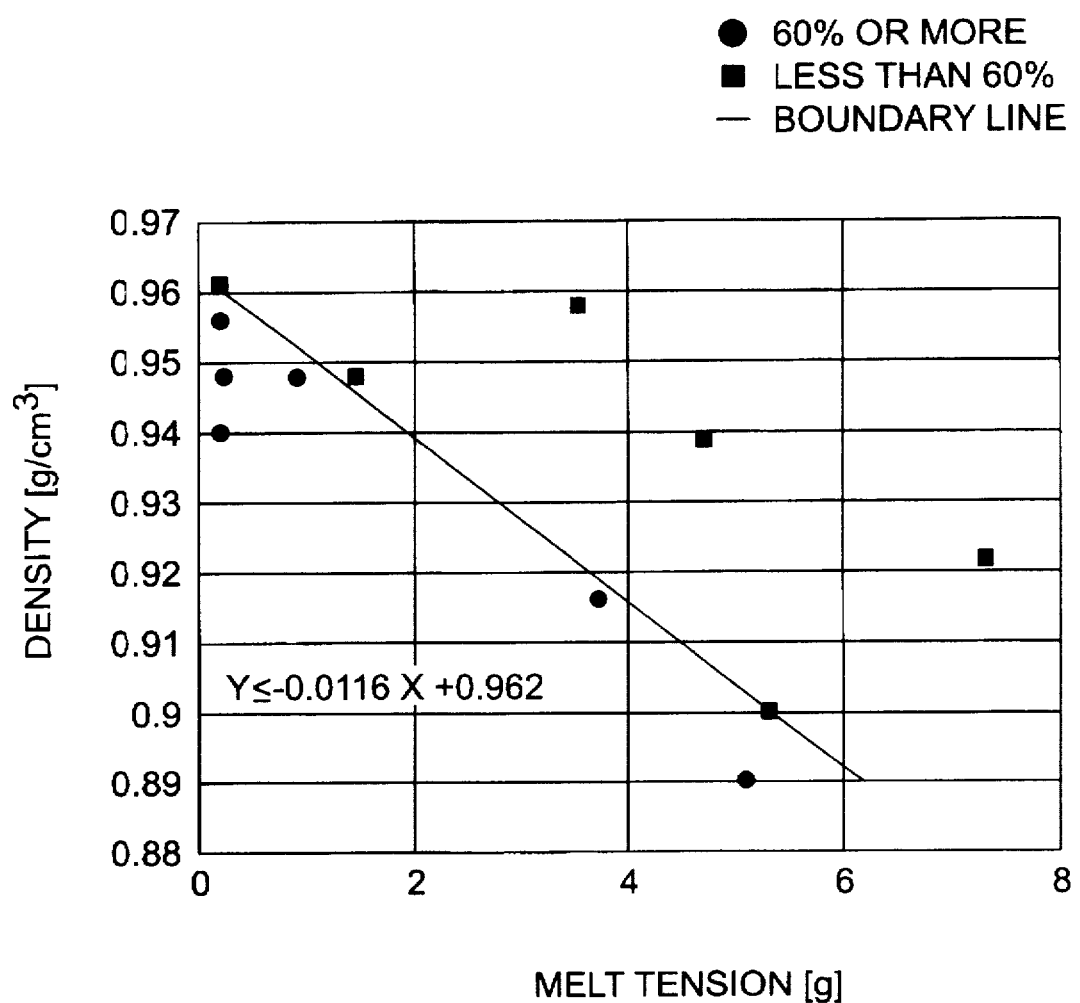
FIG. 1 is a graph plotting the surface gloss of various olefin-based resins, where the abscissa indicates melt tension and the ordinate indicates density.

FIG. 1 plots density (g/cm$^3$) as a function of melt tension (g) of various olefin-base resins. In FIG. 1, a blackened circle (●) indicates that the bottle outer face has a glossiness of 60% or more, a blackened square (■) indicates that the bottle outer face has a glossiness of less than 60%, and the straight line corresponds to the following formula (2):

$$Y = -AX + B \quad (2)$$

where Y is the density (g/cm³) of an olefin-based resin, X is the melt tension (g) of an olefin-base resin, A is a constant having a value of 0.0116 and B is a constant having a value of 0.962.

As seen from the results in FIG. 1, when an olefin-base resin has the combination of a density and melt tension located on or above the straight line (2), the bottle outer face has a glossiness of less than 60%, whereas when the combination is located below the straight line (2), the bottle surface can have an improved glossiness of 60% or more. Hence, selection of an olefin-base resin having a density and a melt tension satisfying formula (1) is critical for providing a high gloss blow-molded plastic bottle. The surface glossiness (60° gloss) is measured in accordance with JIS K 7105-1981: Testing Methods for Optical Properties of Plastics (section 5.2).

In the present invention, it is important to blow-mold a parison formed of an olefin-base resin having a density and a melt tension satisfying formula (1) above in a porous mold having a mirror inner face.

If a mirror face mold is used in forming a bottle, the air bleeding fails upon molding and air traps are generated on the bottle surface. This results in a poor appearance of the bottle. In order to overcome the air traps, as described above, a sandblast mold cavity is used. However, the sandblast face is transferred to the outer face of the olefin-resin bottle thus formed. Due to the transferred pattern, the gloss of the bottle outer face is inevitably reduced.

In the present invention, a porous mold having a mirror inner face is used. Consequently, a plastic bottle having excellent surface gloss can be produced while preventing the generation of air traps.

The porous mold preferably comprises pores having a diameter of from 0.01 to 0.4 mm at a density of from 1 to 1,000 pores/cm². If the pore size or the pore density is less than the above-described range, the prevention of air traps is insufficient. On the other hand, if the pore size or the pore density exceeds the above-described range, the smoothness of the vessel outer surface may be impaired.

The bottle of the present invention may comprise a single layer formed of an olefin-base resin having a density and a melt tension satisfying formula (1) above or may comprise a laminate of an outer layer comprising the above-described olefin-base resin and an inner layer comprising another olefin-base resin, namely, an olefin-base resin having a density and a melt tension that does not satisfy formula (1) above.

When a bottle is formed of the laminate, only a small amount of the specific olefin-base resin satisfying formula (1) is required. Furthermore, because a bottle having good surface gloss can also be produced from a general-use olefin-base resin when the outer face is formed of an olefin-base resin satisfying formula (1), the appearance property can be economically improved.

In the case of a laminate form bottle, the olefin-base resin satisfying formula (1) preferably has a thickness of from 1 to 30%, more preferably from 3 to 15% of the entire thickness of the bottle providing that the lower limit of the thickness is 30 µm. If the outer layer thickness ratio is less than the above-described range, the surface gloss is not satisfied. On the other hand, if the outer layer thickness exceeds the above-described range, the bottle production costs are economically disadvantageous even though there is no reduction in properties.

When a bottle is formed of a laminate consisting of an outermost layer comprising an olefin-base resin satisfying formula (1) above, an outer layer comprising a different olefin-base resin, an inner layer comprising a different olefin-base resin and a gas barrier intermediate resin layer provided via an adhesive resin layer, the plastic bottle not only has an excellent appearance property but also has excellent content preservability.

PREFERRED EMBODIMENTS OF THE INVENTION

Figure 2:
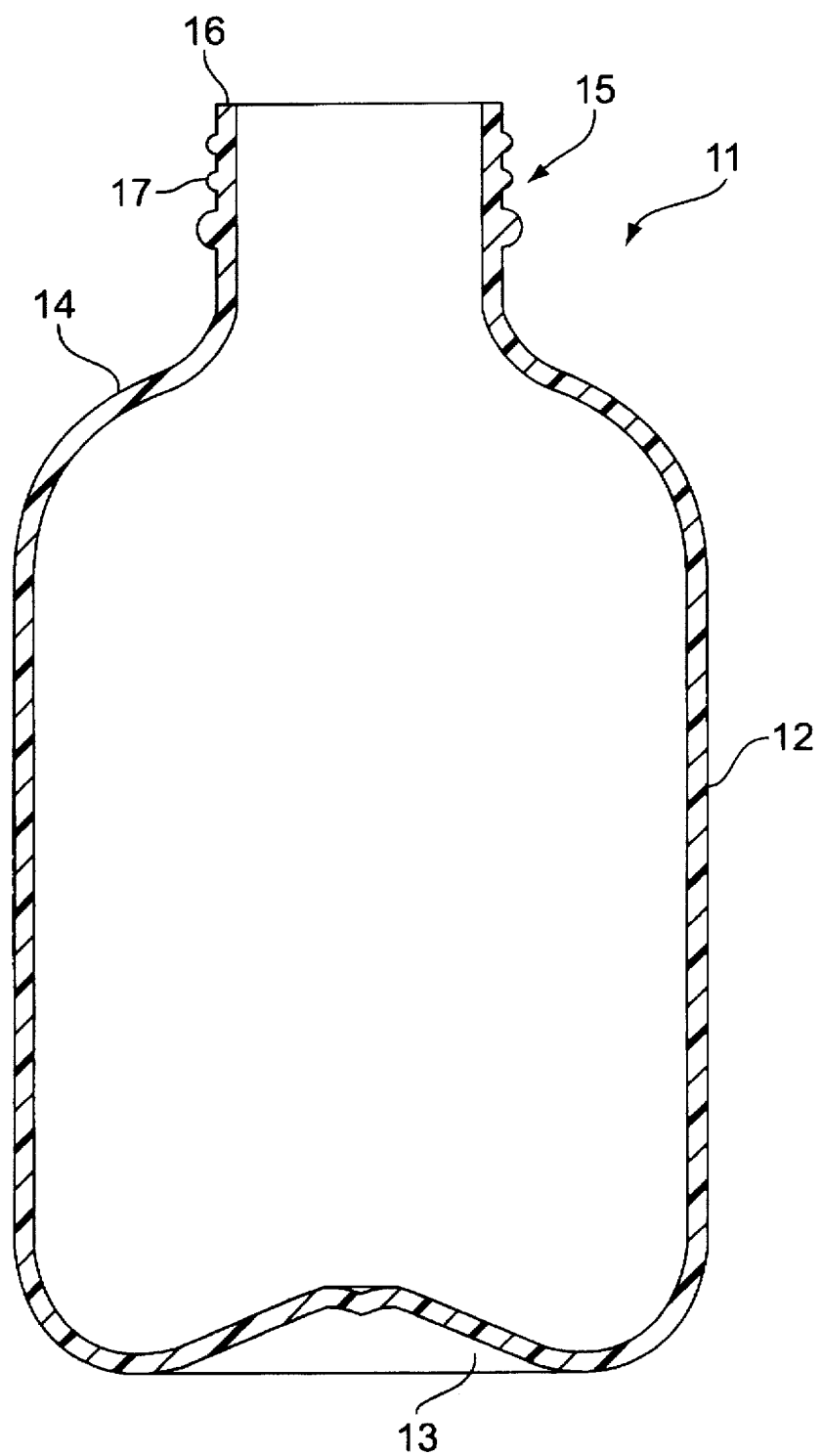
FIG. 2 is a side cross section showing an example of the bottle of the present invention.

FIG. 2 shows an example of a plastic vessel according to the present invention, wherein a vessel 11 comprises a barrel 12, a bottom portion 13 connecting to the lower end of the barrel 12 and formed by pinch-off of the parison, and an open neck portion 15 connecting to the upper end of the barrel 12 through a shoulder portion 14. In the open neck portion 15, a mouth portion 16 to be seal-engaged with a cover (not shown) and a cover fitting portion 17 in the form of a screw, bead, flange or ridge is provided below the mouth portion 16.

Figure 3:
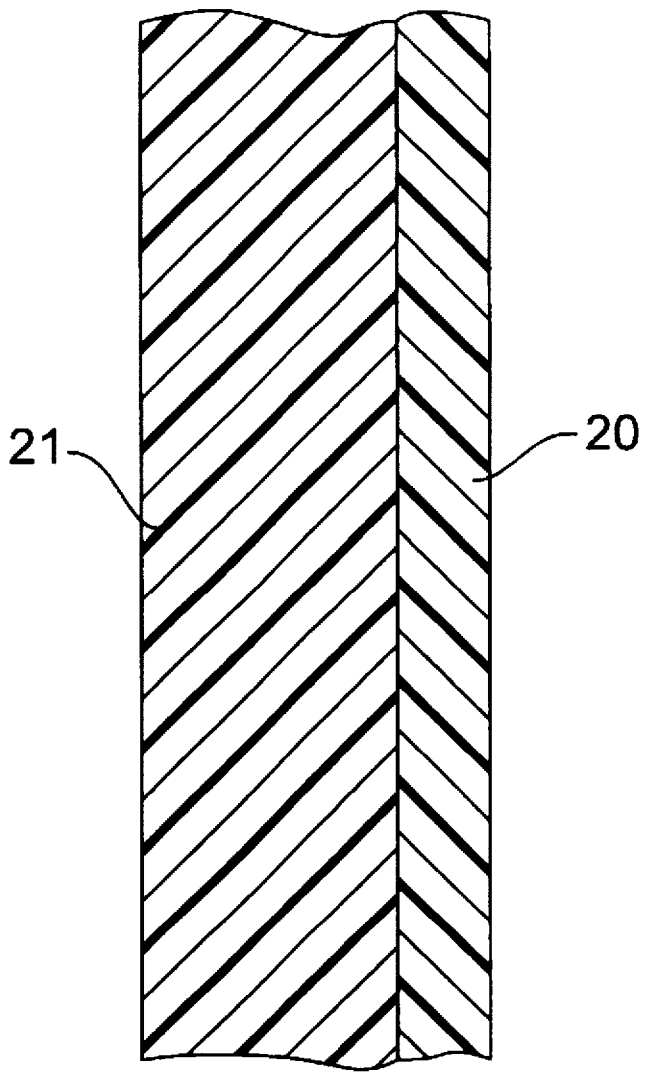
FIG. 3 is an enlarged cross section of the cross-sectional structure of the vessel wall shown in FIG. 2.

The vessel 11 has a multi-layer structure. FIG. 3 shows an enlarged cross-sectional structure of the vessel. The vessel wall comprises a base layer 21 on the inner face side (left side in FIG. 3) of the vessel and an outer face layer 20 on the outer face side (right side in FIG. 3) of the vessel. This multi-layer structure is formed of a laminate obtained by co-extrusion of two kinds of resins. The outer face layer 20 is formed of an olefin resin satisfying formula (1) above and the outermost surface has a glossiness of 60% or more. On the other hand, the base layer 21 on the inner face side of the vessel is formed of an ordinary blow-molding grade olefin-base resin.

Figure 4:
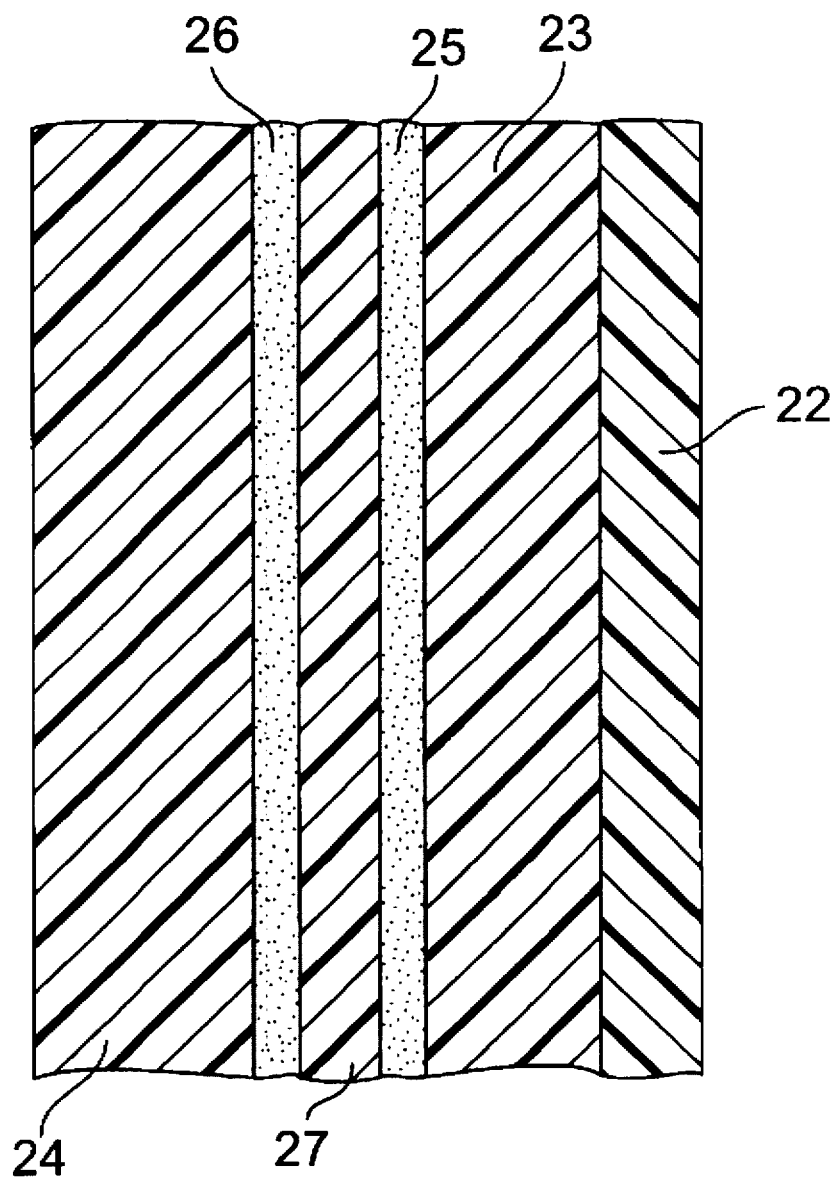
FIG. 4 is a cross section showing another example of the cross-sectional structure of the bottle.
Figure 1:
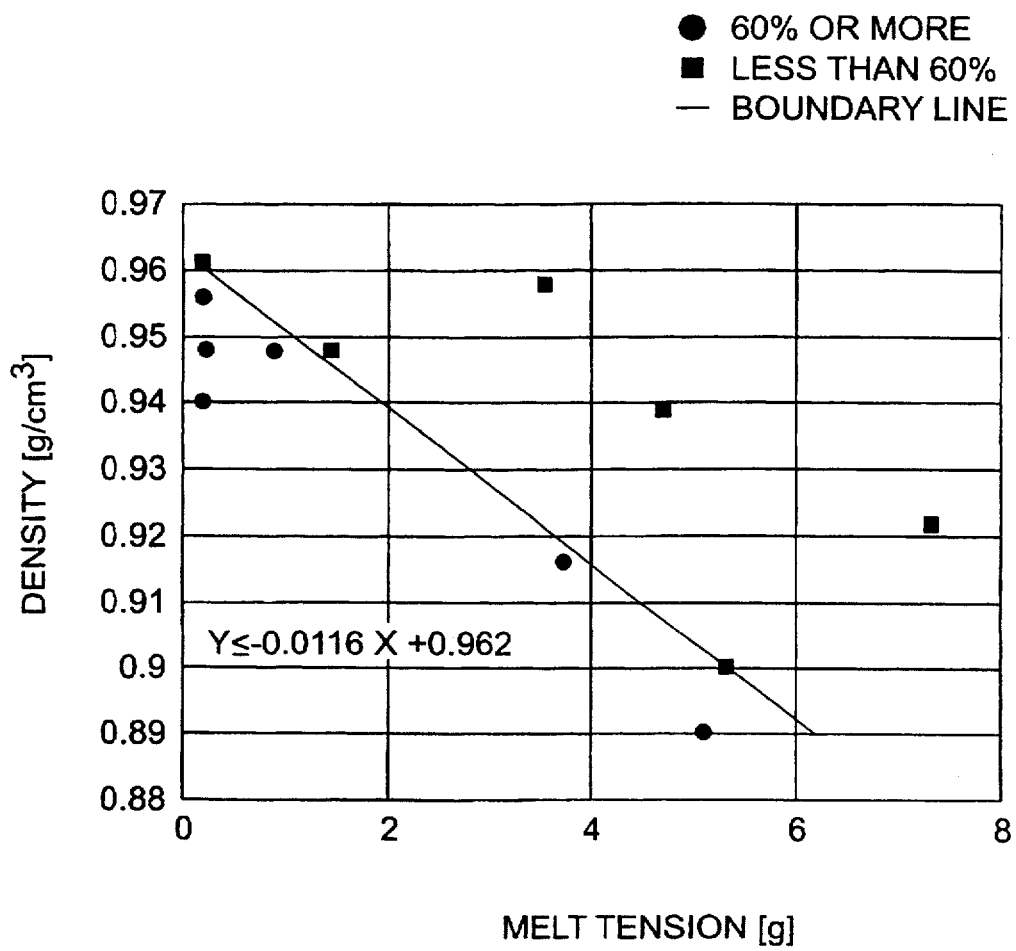
Figure 2:
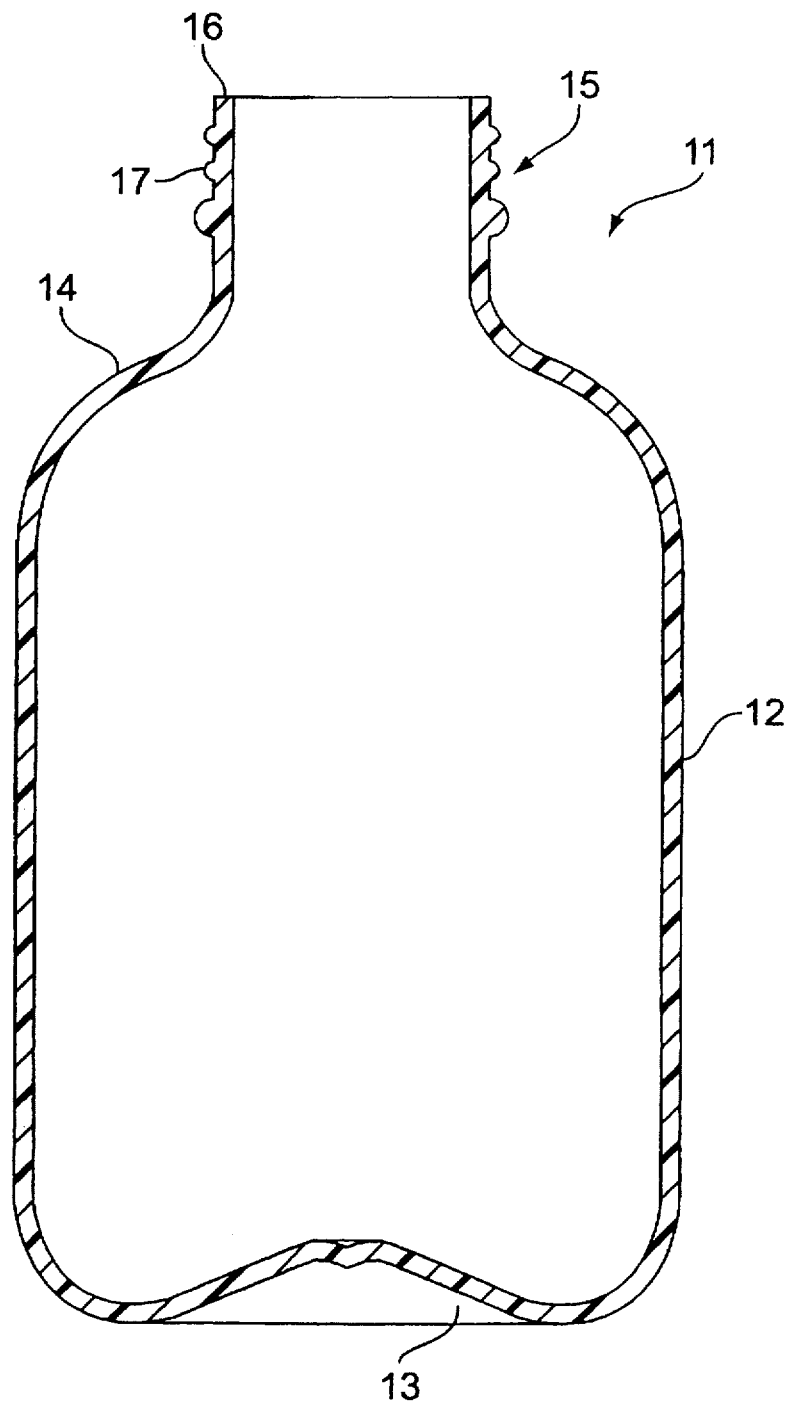
Figure 3:
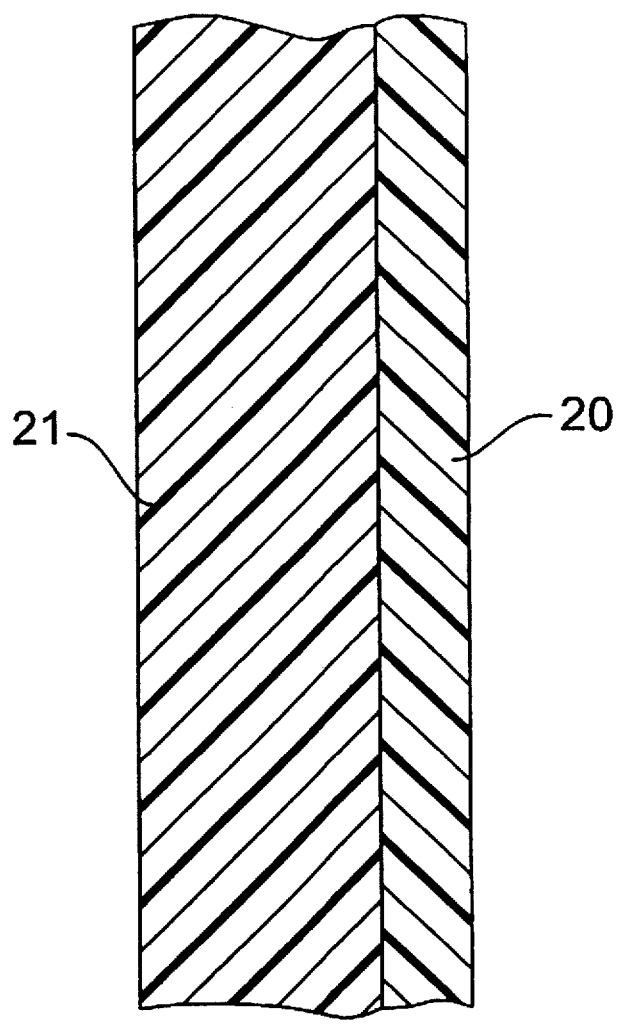
Figure 4:
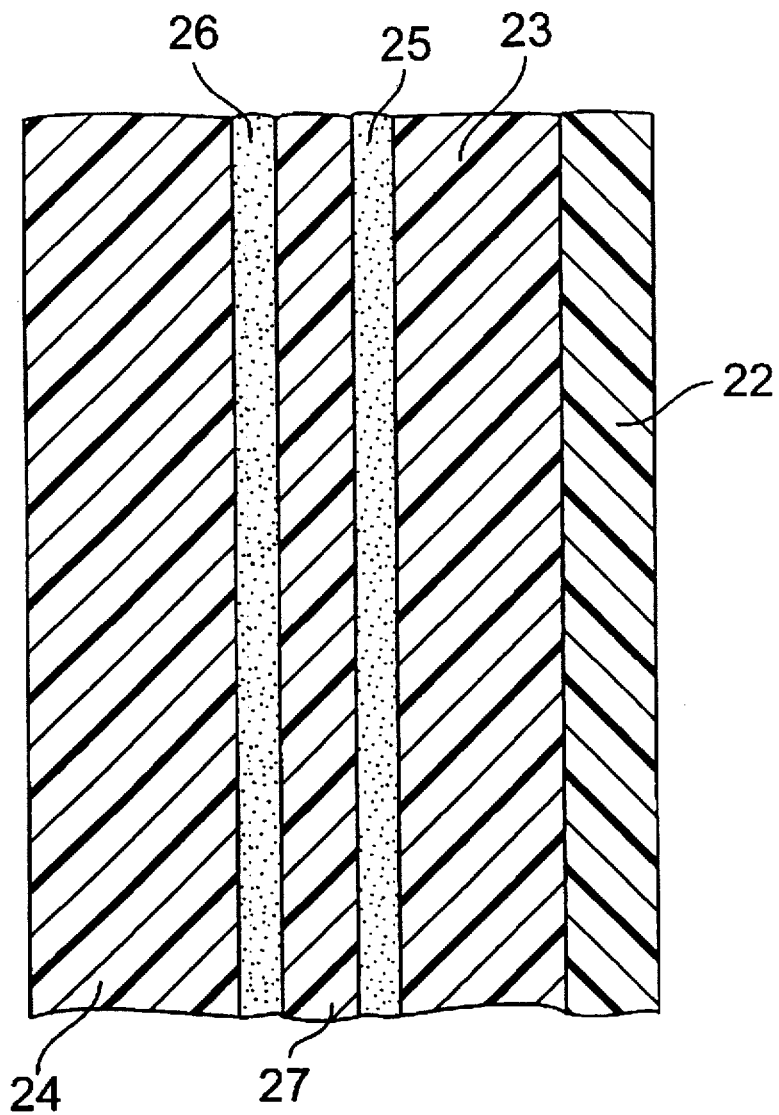

FIG. 4 shows another example of a vessel having a multi-layer structure. The vessel wall comprises an outermost layer 22 comprising an olefin-base resin satisfying formula (1) above, an outer layer 23 comprising a different olefin-base resin, an inner layer 24 comprising a different olefin-base resin, and a gas barrier resin intermediate layer 27 provided through adhesive resin layers 25 and 26.

The olefin resin as an outer face layer or an outermost layer is not particularly limited as long as the relationship between density and melt tension satisfies formula (1). Examples of the olefin-base resin include low density polyethylene, medium density polyethylene, high density polyethylene, isostatic polypropylene, linear low density polyethylene, ethylene-propylene copolymer, polybutene-1, ethylene-butene-1 copolymer, propylene-butene-1 copolymer, ethylene-propylene-butene-1 copolymer, ethylene-vinyl acetate copolymer, ion cross-linked olefin copolymer (ionomer), ethylene-acrylic acid ester copolymer and blends thereof. A resin having a density and a melt tension meeting the standards of the present invention is selected from these resins.

Among the above-described olefin resins, the present invention is particularly useful in producing a bottle having excellent surface gloss from high density polyethylene (HDPE), and suitable examples of commercially available HDPE include STAFLEN E880 (C), STAFLEN E870, STAFLEN E891 and SHOWLEX 5110-1, however, the present invention is by no means limited thereto.

The olefin-base resin suitably has a melt index (MI) generally of from 0.5 to 25 g/10 min, preferably from 1.0 to 20 g/10 min, in view of melt moldability and blow moldability.

The different olefin resin as a base layer (inner layer) includes olefin-base resins having a relationship between density and melt tension outside the scope of formula (1).

Furthermore, the above-described olefin-base resins may be used as the base layer without particular restriction as to density and melt tension. When the base layer (inner layer) of the laminate comprises a resin having a desirable property such as melt moldability, blow moldability, moisture resistance, transparency or mechanical strength and is used in combination with an outer face formed of an olefin-base resin satisfying formula (1), a bottle having any of these properties and, at the same time, excellent surface gloss, can be obtained.

The different olefin-base resin of the base layer suitably has a melt index (MI) generally of from 0.1 to 2.0 g/10 min, preferably from 0.2 to 1.0 g/10 min, in view of melt moldability or blow moldability.

In the present invention, various functional layers may be provided as an intermediate layer between the outer layer 20 and the base layer 21 or in the base layer 21. In FIG. 4, a gas barrier resin intermediate layer 27 is provided in the base layer through adhesive resin layers 25 and 26.

More specifically, in order to make the bottle impermeable to a gas such as oxygen, a gas barrier resin may be integrated into the multi-layer structure. Suitable examples of the gas barrier resin include an ethylene-vinyl alcohol copolymer generally having an oxygen permeation coefficient (PO2) of $5.5 \times 10^{-12}$ cc·cm/cm$^2$·sec·cmHg or less, preferably $4.5 \times 10^{-12}$ cc·cm/cm$^2$·sec·cmHg or less, and having, in particular, an ethylene content of from 20 to 50 mol% and an unsaponified vinyl ester residue content of 5 mol% or less; a homopolyamide and a copolyamide each having from 3 to 30, preferably from 4 to 25 amide groups per 100 carbon atoms, and a blend thereof; and a semiaromatic copolyamide such as poly(hexamethylene isophthalamide/terephthalamide). The above-described ethylene-vinyl alcohol copolymer and polyamide may be used as a blend or as a blend with other thermoplastic resins such as a polyolefin, or a resin capable of imparting adhesion to the polyolefin, may be used within the range, for example, of 20 wt% or less.

In place of or together with the above-described intermediate layer, an oxygen absorbent-containing resin layer or a desiccating agent-containing resin layer may be provided as an intermediate layer, or a regrind (scrap resin) produced upon blow molding may be used as an intermediate layer for recycling.

In the multi-layer bottle of the present invention, the ratio of the outer layer (the olefin-base resin layer satisfying formula (1)) thickness to the entire thickness of the vessel wall is suitably from 1 to 30%, preferably from 3 to 15%, and the lower limit of the thickness is suitably 30 µm or more. If the thickness is less than the lower value, the effect of improving the surface gloss is not satisfactory. If the thickness exceeds the above-noted upper value, the vessel may have reduced blow moldability or increased materials cost. The entire thickness of the vessel wall depends upon the particular application, however, it is suitably from 200 to 1,500 µm.

According to the present invention, an olefin-base resin satisfying formula (1) above alone or in combination with other resin layer is melt extruded to form a parison, and the parison is subjected to blow molding in a porous mold having a mirror face.

Figure 5:
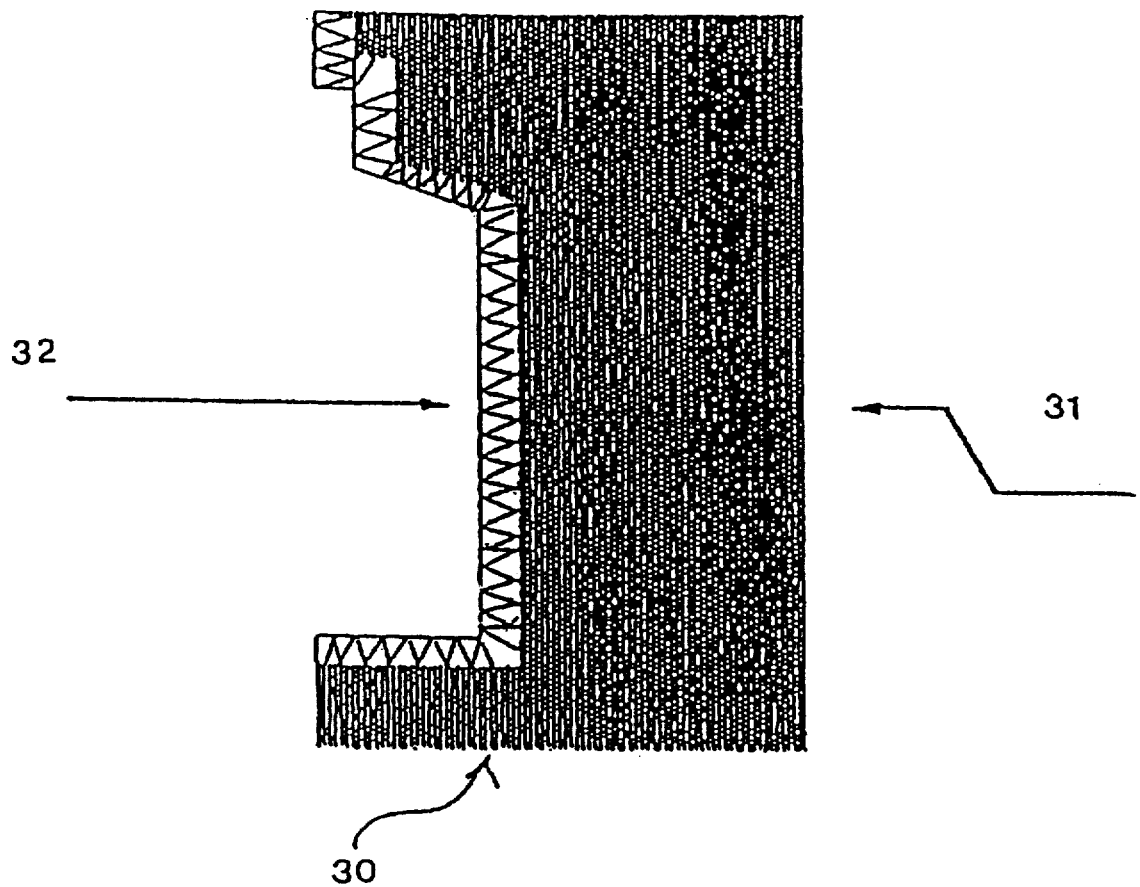
FIG. 5 is a cross section showing an example of a porous mold.

FIG. 5 shows an example of a porous mold 30 including a mold substrate 31 and a porous electroforming layer 32 formed on the cavity side of the substrate. The electroforming layer 32 has both excellent gas permeability and transferability. Thus, air escapes into the electroforming layer upon blow molding to prevent the generation of air traps, and the mirror face is transferred to the outer face of the blow molded article.

In general, the substrate 31 may be made of aluminum or an aluminum alloy and the electroforming layer 32 may be a nickel electroforming layer in view of durability. The electroforming layer preferably comprises pores having a diameter generally of from 0.01 to 0.4 mm, preferably from 0.05 to 0.2 mm, and a density of from 1 to 1,000 pores/cm$^2$, preferably from 10 to 200 pores/cm$^2$. This mold can be produced according to the method described, for example, in Japanese Examined Patent Publication (kokoku) No. 2-14434.

The olefin-base resin is molten in the extruder and melt-extruded into a parison through a die. The die for use in the present invention is generally a circular die, and the extrusion temperature is from the higher melting point of the resins to the decomposition temperature, however, it is suitably from 160° to 230° C. When a resin in addition to the olefin-base resin satisfying formula (1) is used, such as an inner layer olefin resin or further, an intermediate layer or an adhesive resin layer interposed between the inner and outer layers, these resins are extruded simultaneously. In the coextrusion, a number of extruders are used corresponding to the various kinds of resins, and a plurality of molten resin streams are combined in the multi-layer multiple die and then extruded outside the die.

If the extrusion temperature is too high, the parison is very liable to cause draw down, whereas if it is too low, a sharkskin due to melt fracture may result. However, according to the present invention, when using normal extrusion temperatures, generation of draw down, flow marks or a sharkskin can be prevented.

The shear rate of the die upon extrusion is suitably, generally speaking, from $5 \times 10^1$ to $1 \times 10^4$ sec$^{-1}$, preferably from $1 \times 10^2$ to $1 \times 10^3$ sec$^{-1}$.

Then, while still in the molten state, the extruded parison is subjected to blow molding in a porous mold having a mirror face. In the blow molding, a pair of split molds equipped with a parting face is generally used, the parison is pinched off by the split molds, and pressurized fluid is injected into the confined parison.

The pressurized fluid for use in blow molding is generally pressurized air. However, if desired, an inert gas such as nitrogen, steam or another fluid may be used. The pressure is suitably from 4 to 10 kg/cm$^2$ (gauge). The blow mold may be forcedly cooled in advance by cooling water.

The blow molding operation is not particularly restricted, however, it is preferably carried out using a rotary molding machine in view of efficiency. The rotary molding machine has a large number of split molds disposed in its periphery. Thus, the machine can be rotated in a constant direction and the split molds can be switched. The thermoplastic resin parison is extruded from the die head towards a direction tangent to the locus of the split mold centers, the split molds are opened at the tangent position, and the charged parison is pinched by respective split molds to carry out blow molding. After blow molding, the split molds are opened and the molded articles are released.

The present invention is described in greater detail below with reference to the following Examples and Comparative Examples, however, the present invention should not be construed as being limited thereto.

EXAMPLES 1 TO 6

Using a multi-layer blow molding apparatus having an outer layer extruder having a screw size of 32 mm and an inner layer extruder having a screw size of 50 mm, various polyolefins having a density (determined using an automatic specific gravimeter manufactured by Toyo Seiki KK, measured by means of a balance from the mass in air and the mass in a liquid (ethanol)) and a melt tension (measured using a CAPIROGRAPH manufactured by Toyo Seiki KK; set temperature: 190° C., piston descending speed: 5 mm/min, nozzle shape: 2 mm in diameter and 20 mm in length, withdrawing speed: 10 m/min) shown in Table 1 were each fed as an outer layer material into the outer layer extruder. Furthermore, HDPE (HIZEX 6008B produced by Mitsui Petrochemical Industries, Ltd.) was fed to the inner layer extruder to form a cylindrical two-kind, two-layer parison.

Thereafter, each parison was blow-molded in a porous electroforming mold. The electroforming mold (manufactured by Konan Tokushu Sangyo KK) included a mold cavity portion having an average pore size of 0.1 mm and an average pore density of 100 pores/cm$^2$, and the porous electroforming surface was polished with a sand paper (#1200) to provide a mirror state cavity portion. Then, two-kind two-layer bottles having a content volume of 100 ml, an average wall thickness of 700 μm and an average outer layer thickness of 70 μm were obtained.

The surface of each bottle had no trace of air traps. As shown in Table 1, the 60° gloss as measured by an SM Color Computer manufactured by Suga Shikenki KK of all the bottles thus prepared had a glossiness of 60% or more, thus providing excellent surface gloss.

COMPARATIVE EXAMPLES 1 AND 2

Two-kind two-layer cylindrical parisons were formed in the same multi-layer blow molding machine as used in Examples 1 to 6 using various polyolefins having a density and a melt tension (measurement conditions were the same as in Examples 1 to 6) shown in Table 2 as an outer layer material. HDPE (HIZEX 6008B, produced by Mitsui Petrochemical Industries, Ltd.) was used as an inner layer material.

Thereafter, each parison was blow-molded in a conventional mirror face mold to obtain two-kind two-layer bottles having a content volume of 100 ml, an average wall thickness of 700 μm and an average outer layer thickness of 70 μm. The mold cavity portion was plated with chromium to provide a mirror face state, however, the mold did not comprise pores and was not permeable. The surface of each bottle had a large number of air trap traces. Consequently, the bottles thus prepared had no commercial value in view of their appearance.

COMPARATIVE EXAMPLES 3 AND 4

Two-kind two-layer cylindrical parisons were formed in the same multi-layer blow molding machine as used in Examples 1 to 6 using various polyolefins having a density and a melt tension (measurement methods were the same as in Examples 1 to 6) shown in Table 3 as an outer layer material. HDPE (HIZEX 6008B, produced by Mitsui Petrochemical Industries, Ltd.) was used as an inner layer material.

Thereafter, each parison was blow-molded in a porous electroforming mold. The electroforming mold included a mold cavity portion having an average pore size of 0.5 mm and an average pore density of 0.5 pore/cm$^2$, and the porous electroforming surface was polished with a sand paper (#1200) to provide a mirror state cavity portion. Then, two-kind two-layer bottles having a content volume of 100 ml, an average wall thickness of 700 μm and an average outer layer thickness of 70 μm were obtained.

The surface of each bottle had air trap traces and projected traces of mold pores. Thus, the bottles had no commercial value in view of their appearance.

COMPARATIVE EXAMPLES 5 TO 10

Two-kind two-layer cylindrical parisons were formed in the same multi-layer blow molding machine as used in Examples 1 to 6 using various polyolefins having a density and a melt tension (measurement methods were the same as in Examples 1 to 6) shown in Table 4 as an outer layer material. HDPE (HIZEX 6008B, produced by Mitsui Petrochemical Industries, Ltd.) was used as an inner layer material.

Thereafter, each parison was blow-molded in the same porous electroforming mold as used in Examples 1 to 6 to obtain two-kind two-layer bottles having a content volume of 100 ml, an average wall thickness of 700 μm and an average outer layer thickness of 70 μm. The bottles had no trace of air traps. However, as measured by an SM Color Computer manufactured by Suga Shikenki KK (60° gloss), all of the bottles thus prepared had a glossiness of less than 60% as shown in Table 4. Thus, these bottles were inadequate in terms of surface gloss.

TABLE 1

|  |  | Outer Layer Material | | | Bottle |
|---|---|---|---|---|---|
| | Blow Mold | Material | Density (g/cm$^3$) | Melt Tension (g) | Surface Gloss (%) |
| Example 1 | Porous electroforming mold: | HDPE (1) | 0.956 | 0.14 | 60 |
| Example 2 | average pore size: 0.1 mm, | HDPE (2) | 0.948 | 0.86 | 68 |
| Example 3 | average pore density: 100 | HDPE (3) | 0.948 | 0.19 | 75 |
| Example 4 | pores/cm$^2$ | LLDPE (1) | 0.940 | 0.14 | 75 |
| Example 5 | | LDPE (1) | 0.916 | 3.7 | 70 |
| Example 6 | | PP (1) | 0.89 | 5.1 | 74 |

TABLE 2

| | | Outer Layer Material | | | Bottle |
|---|---|---|---|---|---|
| | Blow Mold | Material | Density (g/cm$^3$) | Melt Tension (g) | Surface Gloss (%) |
| Comparative Example 1 | Non-porous mirror face mold | HDPE (3) | 0.948 | 0.19 | many air trap traces |
| Comparative Example 2 | | PP (1) | 0.89 | 5.1 | many air trap traces |

TABLE 3

| | Blow Mold | Outer Layer Material | | | Bottle |
| | | Material | Density (g/cm³) | Melt Tension (g) | Surface Gloss (%) |
|---|---|---|---|---|---|
| Comparative Example 3 | Porous electroforming mold: average pore size: 0.5 mm, average pore density: 0.5 pore/cm² | HDPE (3) | 0.948 | 0.19 | many air trap and mold pore traces |
| Comparative Example 4 | | PP (1) | 0.89 | 5.1 | many air trap and mold pore traces |

TABLE 4

| | Blow Mold | Outer Layer Material | | | Bottle |
| | | Material | Density (g/cm³) | Melt Tension (g) | Surface Gloss (%) |
|---|---|---|---|---|---|
| Comparative Example 5 | Porous electroforming mold: average pore size: 0.1 mm, average pore density: 100 pores/cm² | HDPE (4) | 0.961 | 0.13 | 56 |
| Comparative Example 6 | | HDPE (5) | 0.958 | 3.5 | 25 |
| Comparative Example 7 | | HDPE (6) | 0.948 | 1.4 | 35 |
| Comparative Example 8 | | LLDPE (2) | 0.939 | 4.7 | 38 |
| Comparative Example 9 | | LDPE (2) | 0.922 | 7.3 | 36 |
| Comparative Example 10 | | PP (2) | 0.90 | 5.3 | 52 |

In accordance with the present invention, at least an outer surface of a blow-molded vessel comprises an olefin-base resin having a density and a melt tension satisfying formula (1) above. The blow molding is carried out in a porous mold having a mirror face. As a result, the occurrence of air traps is effectively prevented, and a bottle having excellent surface gloss is produced.

Furthermore, according to a preferred embodiment of the present invention, an olefin-base resin having a density and a melt tension satisfying formula (1) above is laminated on the outer surface of another resin having excellent melt moldability, blow moldability, transparency or other desirable properties. As a result, efficient production that is free of cumbersome steps or increased material cost is achieved.

While the invention has been described in detail and with reference to specific embodiments thereof, it will be apparent to one skilled in the art that various changes and modifications can be made therein without departing from the spirit and scope thereof.

What is claimed is:

1. A process for making a glossy plastic bottle comprising blow-molding a parison having at least an outer face formed of an olefin-base resin having a density and a melt tension satisfying the following formula (1):

$$Y < -AX + B \tag{1}$$

wherein Y is the density (g/cm³) of the olefin-base resin, X is the melt tension (g) of the olefin-base resin, A is a constant having a value of 0.0116 and B is a constant having a value of 0.962, in a porous mold having a mirror inner face.

2. The process as claimed in claim 1, wherein said porous mold comprises pores having a diameter of from 0.01 to 0.4 mm at a density of from 1 to 1,000 pores/cm².

3. The process as claimed in claim 1, wherein the melt tension X is measured using a capillary rheometer having a nozzle diameter of 2 mm and a length of 20 mm at a piston descending speed of 5 mm/min, a temperature of 190° C. and a withdrawing speed of 10 m/min.

4. The process as claimed in claim 1, wherein the plastic bottle comprises a single layer formed of an olefin-base resin satisfying formula (1).

5. The process as claimed in claim 1, wherein the plastic bottle comprises an outer layer formed of an olefin-base resin satisfying formula (1) and an inner layer containing a different olefin-base resin.

6. The process as claimed in claim 1, wherein the plastic bottle comprises a laminate having an outermost layer comprising an olefin-base resin satisfying formula (1), an outer layer comprising an olefin-base resin that is different from that of the outermost layer, an inner layer comprising an olefin-base resin that is different from that of the outermost layer, and a gas barrier resin intermediate layer provided via an adhesive resin layer.

7. The process as claimed in claim 5, wherein the olefin-base resin layer satisfying formula (1) has a thickness of at least 30 μm that is from 1 to 30% of the entire thickness of the bottle.

8. The process as claimed in claim 6, wherein the olefin-base resin layer satisfying formula (1) has a thickness of at least 30 μm that is from 1 to 30% of the entire thickness of the bottle.

9. The process as claimed in claim 1, wherein said olefin-base outer face resin comprises high density polyethylene.

10. The process as claimed in claim 4, wherein said olefin-base outer face resin comprises high density polyethylene.

11. The process as claimed in claim 5, wherein said olefin-base outer face resin comprises high density polyethylene.

12. The process as claimed in claim 6, wherein said olefin-base outer face resin comprises high density polyethylene.

13. The process as claimed in claim 7, wherein said olefin-base outer face resin comprises high density polyethylene.

14. The process as claimed in claim 8, wherein said olefin-base outer face resin comprises high density polyethylene.

15. The process as claimed in claim 1, wherein the outer face of the bottle has a glossiness of 60% (60° gloss) or more.

* * * * *

UNITED STATES PATENT AND TRADEMARK OFFICE
CERTIFICATE OF CORRECTION

PATENT NO. : 5,788,926
DATED : Aug. 4, 1998
INVENTOR(S) : Oda et al.

It is certified that error appears in the above-identified patent and that said Letters Patent is hereby corrected as shown below:

The title page should be deleted to appear as per attached title page.

Please delete drawing sheets 1-4 and substitute drawing sheets 1-5 as per attached.

Signed and Sealed this

Twenty-ninth Day of June, 1999

*Attest:*

Q. TODD DICKINSON

*Attesting Officer*    Acting Commissioner of Patents and Trademarks

United States Patent [19]

Oda et al.

[11] Patent Number: 5,788,926
[45] Date of Patent: Aug. 4, 1998

[54] PLASTIC BOTTLE AND PROCESS FOR MAKING THE SAME

[75] Inventors: Yasuhiro Oda; Yoshitsugu Maruhashi, both of Kanagawa, Japan

[73] Assignee: Toyo Seikan Kaisha, Ltd., Tokyo, Japan

[21] Appl. No.: 692,719

[22] Filed: Aug. 6, 1996

[30] Foreign Application Priority Data

Aug. 16, 1995 [JP] Japan ................................. 7-208940

[51] Int. Cl.$^6$ ................................................. B29C 49/06
[52] U.S. Cl. ........................ 264/512; 264/515; 264/523; 264/540
[58] Field of Search ........................ 428/35.7; 526/352; 264/512, 513, 515, 521, 523, 537, 540

[56] References Cited

U.S. PATENT DOCUMENTS

| | | | |
|---|---|---|---|
| 4,397,916 | 8/1983 | Nagano | 428/35.7 |
| 4,921,733 | 5/1990 | Gibbons | 428/35.9 |
| 5,041,247 | 8/1991 | Kim | 264/540 |
| 5,153,039 | 10/1992 | Porter | 428/35.7 |
| 5,180,190 | 1/1993 | Kersey | 428/36.1 |
| 5,405,880 | 4/1995 | Kimura | 428/35.7 |
| 5,443,868 | 8/1995 | Oda | 428/35.7 |
| 5,500,261 | 3/1996 | Takei | 428/35.7 |
| 5,601,891 | 2/1997 | Herman | 428/35.7 |

*Primary Examiner*—Paul R. Michl
*Attorney, Agent, or Firm*—Sughrue, Mion, Zinn, Macpeak & Seas, PLLC

[57] ABSTRACT

A plastic bottle having at least an outer face formed of an olefin-base resin, wherein the olefin-base resin has a density and a melt tension satisfying the following formula (1):

$$Y \leq -AX + B \quad (1)$$

wherein Y is the density (g/cm$^3$) of the olefin-base resin, X is the melt tension (g) of the olefin-base resin, A is a constant having a value of 0.0116 and B is a constant having a value of 0.962, and the bottle outer face has a glossiness of 60% (60° gloss) or more. Also disclosed is a process for making the above-described plastic bottle.

15 Claims, 5 Drawing Sheets